(12) United States Patent
Kanter

(10) Patent No.: US 11,546,745 B2
(45) Date of Patent: Jan. 3, 2023

(54) DISTRIBUTED CONTEXT-SHARING NETWORKS

(71) Applicant: Theo Kanter, Rönninge (SE)

(72) Inventor: Theo Kanter, Rönninge (SE)

( * ) Notice: Subject to any disclaimer, the term of this patent is extended or adjusted under 35 U.S.C. 154(b) by 0 days.

(21) Appl. No.: 17/407,894

(22) Filed: Aug. 20, 2021

(65) Prior Publication Data

US 2021/0385636 A1    Dec. 9, 2021

Related U.S. Application Data

(63) Continuation of application No. 16/730,426, filed on Dec. 30, 2019, now Pat. No. 11,102,635, which is a continuation of application No. 15/165,526, filed on May 26, 2016, now Pat. No. 10,524,101.

(51) Int. Cl.
| | | |
|---|---|---|
| *G06F 15/173* | (2006.01) | |
| *H04W 4/70* | (2018.01) | |
| *H04W 4/38* | (2018.01) | |
| *H04L 67/12* | (2022.01) | |
| *H04L 67/51* | (2022.01) | |
| *H04L 67/02* | (2022.01) | |

(52) U.S. Cl.
CPC .............. *H04W 4/70* (2018.02); *H04L 67/02* (2013.01); *H04L 67/12* (2013.01); *H04L 67/51* (2022.05); *H04W 4/38* (2018.02)

(58) Field of Classification Search
CPC .......... H04W 4/70; H04W 4/38; H04L 67/02; H04L 67/12; H04L 67/16

USPC ......................................................... 709/223
See application file for complete search history.

(56) References Cited

U.S. PATENT DOCUMENTS

| | | | | |
|---|---|---|---|---|
| 7,873,673 | B2 * | 1/2011 | Cleveland | H04W 4/38 707/804 |
| 9,275,093 | B2 * | 3/2016 | Pandey | G06F 16/2264 |
| 9,500,739 | B2 * | 11/2016 | Woodruff | G01S 3/802 |
| 9,736,004 | B2 * | 8/2017 | Jung | G06F 21/60 |
| 2009/0141898 | A1 * | 6/2009 | Huang | H04L 9/0833 380/28 |
| 2010/0008256 | A1 * | 1/2010 | Chebbo | H04W 40/32 370/254 |
| 2015/0127733 | A1 * | 5/2015 | Ding | H04W 4/70 709/204 |

FOREIGN PATENT DOCUMENTS

WO   WO-2009138119 A1 * 11/2009   ....... G06F 15/17306

\* cited by examiner

*Primary Examiner* — Atta Khan
(74) *Attorney, Agent, or Firm* — Patent Portfolio Builders PLLC

(57) ABSTRACT

A computer-implemented method for network management is disclosed and includes broadcasting, from a first sensored wireless transceiver, an availability to accept data from other sensored wireless transceivers; receiving, from one or more other sensored wireless transceivers, requests to subscribe to provide sensor data to the first sensored wireless transceiver; subsequently receiving data that indicates sensor values from the one or more other sensored wireless transceivers; aggregating the data that indicates sensor values; and transmitting the aggregated data to a central service through the Internet.

16 Claims, 4 Drawing Sheets

DISTRIBUTED CONTEXT-SHARING NETWORKS

TECHNICAL FIELD

This document generally describes technology related to network systems, and the improvement of computer-based networks.

BACKGROUND

The networking of electronic devices has enabled great advances in technology. For example, local area networks enable employees of an organization to communicate more conveniently with each other using e-mail and other software applications. The Internet and associated applications like the World Wide Web enable similar communication across the world, and also enable the delivery of rich services to various users, such as web pages, hosted applications, and numerous other implementations.

Many speak of obtaining such services from the "cloud." Such activity generally involves providing computing services from server systems and accessing those server systems from a large number of client devices, such as laptop computers or smartphones. As the "Internet of Things" becomes more predominant, the number of end node client devices will grow greatly. But the cloud approach may become too inefficient or inflexible (or both), as communications must travel too far to get to the relatively low number of servers that provide the services, or as the servers are called on to respond to an extremely large number of requests. Furthermore, decisions made in end-points based on local information can render communication with the cloud unnecessary, except for information about results that are of non-local interest.

SUMMARY

This document generally describes systems and techniques for providing distributed data collection and control in a computer network. More particularly, the document discusses establishing and managing sub-networks through sensored end nodes in a broader network. As described in more detail below, each end node may publish itself for connection to other nearby nodes and/or can subscribe to other nodes that have published their availability. Each node may also track contextual information for itself and receive and store corresponding contextual information for other nodes with which it has a publish-subscribe relationship. Each such end node may also collect data from one or more sensors, and if it has subscribed to another sensor, may pass its data to that other sensor, either without prompting and/or in response to a request from the other end node. End nodes that collect such data from other nodes may store, not only the collected sensor data, but also contextual data about the various nodes that they receive information from. For example, each node that gathers data may store information that characterizes the types of sensors on each of the other nodes that send it sensor data—such as temperature sensors, motion sensors, magnetic sensors, humidity sensors, glucose sensors, noise sensors, and the like.

Such nodes are established as first-class objects in an entity-relationship model that is kept by each node in the sub-net, where each node centers the model on its own agent, and relations to other entities are weighted on relevance, as determined by a clustering algorithm. When the node-determined relevance for another node falls below a threshold, the particular node no longer keeps the relationship and it may discard data for the other node. Though usable with sensored end nodes, the network management here can be used in other manners, and is a self-contained overlay network that works across hosts that have link layer connectivity. For example, the network described here may operate in a wireless sensor network (WSN) or connect nodes on the Internet, because it can implement its own reachability mechanism without requiring a DNS. The relevant user agents for the network The end nodes that gather data from other nodes may then communicate with a wider network that is outside of and separate from the net that the end nodes make together with each other. For example, one of the end nodes may communicate, not just with the other end nodes, but with a gateway that connects to other systems (or may itself incorporate the gateway), for instance a cloud service on the Internet. Where the sensored network is implemented as an overlay on the Internet itself, a gateway node may be required for communications within the overlay to be able to reach entities outside the overlay. In this manner, the communicating end node may receive requests for information from the wider network, and may pass on data that it gathers from the other end nodes (and data it collects from its own sensors) in response to such requests. The requests from the network may include contextual information for the sort of data that is sought, and the communicating end node may use the contextual data it has stored about each of the other end nodes in its net in order to respond to the requests. For example, a request may seek information from certain types of sensors, such as temperature sensors. The request may also have multiple parameters, such as seeking data only from temperature sensors within a certain geo-fence area. The communicating end node may search a table into which it has placed context data and sensor data from the other end nodes, may make requests for additional data if necessary, and may aggregate the data and return it through the gateway to the requester.

The end nodes may also be programmed to perform analysis of the data that they or other nodes in their sub-net collect, toward a common goal. For example, a medical patient who has returned to their home from a hospital may be order to take medication according to a certain schedule. The patient may be provided with a sensored pillbox and a camera (either worn by the patient or mounted in the patient's dwelling) which may cooperate to form a sub-net and share information that they have gathered. Each may perform analysis on the data it gathers, and one or both may perform analysis on information that multiple sensors in the sub-net gather. For example, the camera may determine a time that particular motion in a scene occurred and may also identify that it indicates motion of a human. It may pass to other nodes in the sub-net the information indicating sighting of a human and the time of the sighting. The pillbox node may receive such data from the camera node. It may have sensors for determining when a part of the pillbox has been opened, and when it was opened. It may in turn store data about when medication is to be taken, and be programmed to analyze its own time data, and the data received from the camera to determine whether medication was accessed at an appropriate time. It may report outside the sub-net only if there is a failure to take medication, and may also periodically report positive data (such as once per week). Such distribution of the intelligence into the sub-net can greatly reduce signaling that would otherwise have to be transmitted across the more general network.

In one implementation, a computer-implemented method for network management is disclosed. The method comprises broadcasting, from a first sensored wireless transceiver, an availability to accept data from other sensored wireless transceivers; receiving, from one or more other sensored wireless transceivers, requests to subscribe to provide sensor data to the first sensored wireless transceiver; subsequently receiving data that indicates sensor values from the one of more other sensored wireless transceivers; aggregating the data that indicates sensor values; and transmitting the aggregated data to a central service through the Internet. The data can be aggregated by the first sensored wireless transceiver in response to receiving a request from the central service, wherein the request identifies a particular parameter to which the data is to be directed. Also, the first sensored wireless transceiver may query an internal database that has a sensor type field to identify sensor readings that are responsive to the request. Moreover, the sensor type field may be hashed on the first sensored wireless transceiver.

In certain aspects, the first sensored wireless transceiver and the one or more other sensored wireless transceivers communicate by way of a network that is layered over an underlying local area network. The method can also include determining at the first sensored wireless transceiver, a degree of proximity of each of the one or more other sensored wireless transceiver to the first sensored wireless transceiver, and determining whether to aggregated data from each of the one or more other sensored wireless transceivers based on a determined level of proximity between the transceivers. Moreover, the determined level of proximity includes, as a factor, a determined geographic proximity between the first sensored transceiver and particular ones of the one or more other sensored transceivers. In addition, the first sensored wireless transceiver and the one or more other sensored wireless transceivers can each represent nodes in their storage as first-class objects in an entity-relationship model.

For each of the computer-implemented methods just discussed, this document also discloses one or more computer-readable devices that include a computer readable medium that stores instructions that, when executed, perform the actions described with respect to the methods just discussed.

In certain implementations, the systems and techniques discussed here may provide one or more advantages. For example, end nodes (which are entities that may be implemented in host devices in the form of user agents, where the host devices may take a variety of forms such as standalone sensors, arrays of sensors, network gateways, and the like) may cooperatively establish a useful network and share information without the need for a central server system (though the group of end nodes can additionally communicate with a server system). Such a distributed network can act as an overlay network for other local networks that may otherwise operate in an area (e.g., WiFi networks), and may route communications using information that the end nodes share cooperatively with each other, and that can be queried from entities separate from the end nodes. In particular, a requesting service (e.g., a web server system) may send a request for temperature readings of all temperature sensors in a particular geographic area. A communicating end note that is interacting with multiple temperature sensor end nodes (and that may itself contain a temperature sensor) may receive such a request, identify that it is a request for temperature data, and may return all of the temperature data it has compiled and/or may obtain temperature data from each of the other end nodes as a result of receiving the request. The communicating end node may then return the compiled data for the multiple other end nodes to the requester, along with other information optionally, including lat/long locations for each sensor, times of the temperature reading, and other additional sensor parameters that each sensor may acquire or that the communicating end node may generate. In this manner, access may be had to data from a wide variety of sensors without a need for tight system-wide coordination, and the data may be obtained in response to specific requests for specific types of data.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document generally describes techniques for establishing and managing a network of distributed entities in the form of end nodes in a flexible and distributed manner. In particular implementations, the end nodes can be part of physical devices that include sensors for obtaining sensed data of a variety of parameters, typically in the immediate vicinity of the particular end node device, such as temperature sensors or humidity sensors or light sensors. As described below, end nodes that contain various sensors can self-organize and share context information with each other so that data from the sensors can be gathered by a particular end node, and that particular end node can report the data when such data is requested, e.g., from a server system in the cloud making a request over the Internet. Such organization may occur by certain nodes holding themselves out as nodes that other nodes can subscribe to. The subscribing nodes may, after such subscription, then pass their sensor reading data to the collecting nodes to which they have subscribed. The collecting nodes may package that data together with data from their own sensors and perform analysis on such joined data and/or submit the combined data to a central service that may request it.

Figure 1:
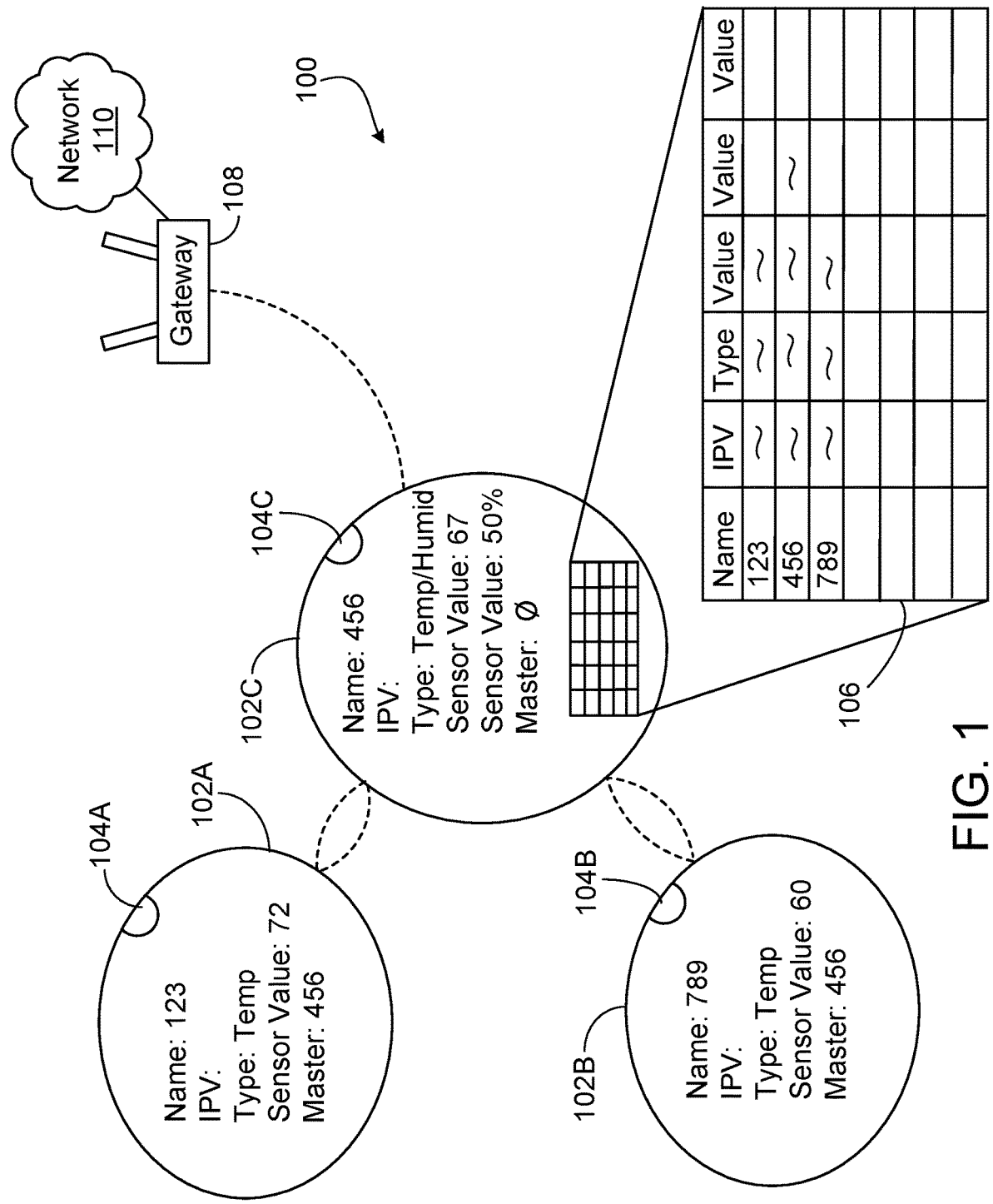
FIG. 1 is a conceptual diagram of a distributed networked sensor system.

FIG. 1 is a conceptual diagram of a distributed networked sensor system 100. In general, the system 100 provides for the formation of a sub-net of wireless sensor/transceiver end nodes that communicate with each other, such as by each of multiple sensored end nodes communicating with a particular master end node that also has sensors, but additionally collects and stores data from the other end nodes, and also responds to properly-formatted requests to obtain access to such data, and thus may act as a gateway node. In certain implementations, every node in the sensored network may collect and store data gathered by every other node, a single node may store information from other nodes while those other nodes simply gather their own information and then communicate it to the single node, or a plurality of the nodes but not all of the nodes may gather and store information collected by themselves and various ones of the other nodes (e.g., three different nodes in a 100-node overlay network could receive and stored data collected by all the other nodes, and may provide triple redundancy if they each store data from every one of the nodes.

The network here may be implemented as an overlay network on another underlying network such as an overlay network on a WiFi network that would otherwise operate in a local area. The figure shows only node 102C storing information from other nodes (e.g., 102A and 102B), but in typical implementations, node 102C might simply be a bootstrap node that started the network, but every node in the sensed network may provide the same functionality as that bootstrap node once the other nodes have published their availability and subscribed to the other nodes then in the network. Specifically, each node in the sub-net may obtain the same data from every other node as node 102C is shown as storing in this example. All nodes would thus be equal in terms of each maintaining its own copy of a distributed index of each other's existence, and data from each other, including contextual information from each other node. A gateway for achieving communications with a network on which the sensed network is overlaid may then be accomplished by one of the sensed nodes or by a separate device such as a local Internet router (e.g., a home WiFi access point). For example, a router manufacturer may expand an existing product line with a firmware or other upgrade that adds functionality to manage an overlay network like that described here.

At the conceptual center of the figure in the pictured example is end node 102C, in wireless communication with end nodes 102A and 102B, each of which may implement a distinct user agent for the overlay network. The three nodes 102A-C together make up an overlay network connected via wireless links (though many more nodes may make up the network), where each node is implemented in a discrete device that carries out the user agent functionality and sensor data collection and management functionality (e.g., local storage of context information for itself and other nodes, maintenance of the DHT (distributed hash table), and other such functions). Other functionality of each device may take part in producing the connectivity for the nodes (e.g., WiFi, ZigBee, or other protocols), and the user agents for each respective node may ride on top of such connections (and where multiple types of connection are available with the devices, the user agents may choose from among those connections in forming the overlay network).

Node 102C, as described in more detailed below, has been assigned the task of collecting data from the other nodes 102A-B in the sub-net. It may have been assigned this role as a result of being the first node, the bootstrap node, in establish such a peer-to-peer overlay network. The node 102C has the responsibility to maintain the network and uses universal context identifiers (which may be termed UCIS, similar to URIs) for naming the context information in the network. A form of a UCI may be: "uci://hello:world@example.com/programming?language=java." The nodes may form what can be termed here a DCXP network that forms content storage to keep track of source addresses for each such UCI. The tracking may use a distributed hash table to provide an efficient manner to perform look-ups. When a new node attaches to the network, the context server (which may operate on the same device as an end node or on another device may register the new end node's UCI. As a result, a node that wants to communicate with another node may do so by knowing the UCI for the other node, because the context server can return the associated address needed to form the communication (similar to the operation of a DNS server).

The context information is exchanged among the nodes and can be used to affect the flow of programs operated by devices that implement particular ones of the end nodes. The context information can include, for example, information that indicates the relative physical positions of two nodes in the network or the relative values of sensed parameters from the nodes (e.g., if one node in an array of outdoor sensors indicates a change in temperature, followed by another node East of the first, and then another East of the second, the program flow may change to indicate the presence of a warm front moving toward the East).

Each of the three nodes 102A-C may be identical to each other, and node 102C may have simply been picked to be a receiver of information from the other nodes, or end node 102C may have greater capabilities than do nodes 102A and 102B, or multiple nodes in a sub-net may have capabilities like those described here for node 102C. In general, the nodes 102A-C can be hosted in any device that has the capability to establish a communication link in the relevant network (e.g., smartphone, sensor/actuator device, gateway or server, because the addressing and reachability is self-contained in the overlay network).

In this example, the devices holding each of nodes 102A-C include one or more sensors 104A-C. Each of the sensors 104A-C may be accompanied by appropriate electronic circuitry to convert a sensed parameter into a standardized digital value that can be communicated with and interpreted by entities separate from the particular node 102A-C. The device for each node 102A-C may, for example, include a microcontroller (or other form of microprocessor) and memory to receive inputs in the form of a varying voltage from a sensor, to convert the input into one or more binary values at a particular time, and to store such values at multiple different points over time (e.g., in volatile or non-volatile memory).

Each end node 102A-C has shown within it a variety of fields into which it can store data. Other or additional fields may also be used as appropriate to address the particular parameters that are being measured. In this example, each node has a name, represented here for convenience as a 3-digit number, but in typical implementations as a binary representation, such as a unique ID provided at manufacture to the particular node. Each node also has an IP address that may be static or dynamically assigned for use within the sub-net. Each node 102A-C also has a label that identifies the type of sensor or sensors that it hosts. In this example, nodes 102A-B are temperature sensors only, while node 102C senses both temperature and humidity. Next, each of the end nodes 102A-C stores a value for its sensed parameter, here 72 degrees for node 102A, 60 degrees for node 102B, and 67 degrees for node 102C. In certain embodiments, each node may have multiple stored values at any time, such as where each node is programmed to capture a new value every ten minutes and to save a plurality of values such as 24 hours of values. The particular number of values to be captured may be a function of the costs of memory and of battery load for frequency of wireless transmission, in addition to the particular granularity that is expected to be desired by users of such a system 100. For example, a slow-changing value like outdoor temperature may not need to be captured and saved as often as a value that changes more quickly or frequently. Although not shown, each value may also be time-stamped with the time (e.g., in GMT) that the value was captured. Finally, each node stores a value for its corresponding master node, which here is node 102C, where the representation may be a unique name for the master node and/or an IP address for it.

Other fields than those shown here may also be stored for each end node 102A-C. For example, each node may store latitude and longitude (lat/long) information that indicates where it is located, and such data may be passed back to a requesting node along with the sensed values. The location information may be sensed by a unit in the end node, may be entered manually by a user, or may be obtained from another computer, such as by a user employing a tablet or laptop computer when setting up an end node, and communicating location information from such tablet or laptop to the end node. The nodes may also store information that aids in analyzing the parameter values they report, such as by a temperature sensor indicating whether it is located indoors or outdoors, a motion sensor indicating whether it is fixed in a building or mounted to a moving item, and other such contextual data.

The nodes 102A-C may be implemented in devices with sensors and/or actuators of a wide variety of forms. For example, position sensors may be employed to determine whether a particular component of a device has been moved (e.g., to determine whether a door on a house or on a pillbox has been opened and closed, and when it occurred), a temperature sensor or group of temperature sensors may measure the current temperature at a particular geography (whether indoors or outdoors), In a similar manner, light sensors, humidity sensors, airflow speed sensors, and any other appropriate form of sensor may be joined with a user agent in a device to collection of data that can then be processed both before and after being transmitted from the particular device. The measured data may be represented and communicated according to particular agreed standards, such as SensorML.

The relevance of one end node to other end node may be determined using clustering analysis, such that, for example, the first sensor can determine which other end nodes to make part of the sub-net that it communicates directly with. Such determination may be generated as a result of determining a relational proximity between the particular end node and each of one or more other end nodes. The multiple parameters that can be used to determine the proximity include physical (or geographic) proximity of the end nodes, similarity in the parameter being sensed when the end nodes are tied to a sensor, whether the end nodes are registered to a common operator (e.g., the company or person who deployed them), the frequency with which each end node reports data, whether the end nodes were manufactured by a common organization (e.g., so that Intel end nodes are more likely to join up with other Intel end nodes than with other Cisco end nodes, though they have the technical ability to join up with either), and other parameters. The clustering determinations may be made in each end node with respect to other end nodes that it will communicate with through the overlay network. The determinations of proximity across multiple dimensions for different nodes may be realized as an extension of two-dimensional approaches by using an n-dimensional distance metric such as the Manhattan or Euclidean distance. In doing so, an application space (which may identify the parameters monitored by sensored end nodes, and acceptable values for each such parameter, such as temperature, humidity, and light levels) may be initially partitioned into domain situations or events, and where each situation space can be simplified to an n-dimensional hyperspace comprising a collection of regions or attributes. Each space is further occupied by a collection of context states, which are a collection of single-valued attributes at a time T within a context space. The relational context proximity between two nodes is the Euclidian distance between the two nodes. In this example, end node 102C includes an additional sensor value field, with a value of 50%, because it senses both temperature and humidity. In certain implementations, a common time stamp may be associated with each such entry for the two parameters that are sensed, as the node may be programmed to sense each of its parameters periodically and at substantially the same time. Also, node 102C has a null value for it master node because it does not have a separate end node to which it reports its data.

In this example, node 102C does include a table 106 into which it may store data that it receives from the other end nodes (which may include end nodes 102A-B, and additional end nodes that have agreed to provide data to end node 102C). The table may take a variety of forms (and commonly be a small relational database) and may include, for example, a unique identifier or name for each node along with all or some of the information stores locally on each such node. In certain implementations, the data in table 106, in one or more fields, may be hashed or otherwise encoded to make search and recovery of such data more efficient. For example, values of varying length can be made more efficient to match if they are hashed down into strings that have a single length. The original values of such hashed entries may then be recovered by a mapping of the values to their hashed values.

The end node 102C is also in wireless communication with a gateway 108, which it may use to receive communications from outside the sub-net and to respond to such communications. The gateway 108 may take a variety of familiar forms, and may serves as an Internet router to a home or business to permit various items at the home or business to communicate with the Internet. The gateway 108 may support a variety of wireless communication protocols include IEEE 802.11 versions, Zigbee, and others. Any other appropriate node in the overlay network may similarly provide access to resources outside the overlay network. In particular, because the overlay network uses connections created by the underlying network, that underlying network may likewise be used to bring data from outside the particular overlay network into the overlay network, and to take data out of the overlay network. For example, each device that holds an end node may, in certain circumstances, communicate with systems separate from the devices that host the rest of the end nodes for the particular overlay network. The abstraction layer of having the overlay network, allows any node in the overlay network to see any other node as being local, relatively independent of the underlying networks that host the overlay network.

Network 110 may include a local area network, the Internet, and various services that may communicate with node 102C through the Internet. For example, the National Weather Service may establish a hosted service to obtain digital temperature readings from across the country. It may thus identify end nodes such as end node 102C that have outdoor temperature sensors in their sub-net. It may then gather periodically temperature readings from end node 102C and other such reporting end nodes, where such readings may include data from other end nodes that do not communicate directly with the service.

In operation then, system 100 may start with a user installing sensor 102A, e.g., as a temperature sensor for the user's home that reports to a display in the user's living room. That sub-system may have wireless capabilities—both form the sensor to a base station and from the base station to any nearby network as an end node to that network. The user may leave such communication open and unsecure, since temperature collection is not a sensitive topic. Later, the user or a neighbor may install end node 102C, which again may have a temperature sensor, and in this example also has a humidity sensor. Upon being put through its installation sequence, end node 102C may broadcast a message seeking other compatible end nodes within its wireless range. End node 102A may be operating in a listening mode and upon hearing from end node 102C may announce its presence and willingness to enter into a communication relationship—to subscribe to provide data to end node 102C. The two nodes may then exchange basic static data such as IP addresses, the location of end node 102A (assuming it is fixed), the types of sensors in end node 102A, and other contextual information about end node 102A.

The context information that is exchanged and is used in various ways by the end nodes is open-ended and not limited to sensor information. More particularly, the context information may be any appropriate information that indicates properties of each entity that holds a particular end node, and the current status of such an entity (such as whether the entity is moving, where it is located both absolutely and in relation to other entities having end nodes, etc.). The context information can include, for a particular end node, state information as well as operations performed by the entity for the end node. In a simplest form of a sensored end node, the context information may concern some measureable value. The information may also include context from outside the overlay network devices, such as presence information identified from other sources, preference information for a person who corresponds to one of the end notes (e.g., s music playlist on a hosted Internet music streaming service, etc.). In a more complex example, the context information may correspond to a camera sub-system that performs image analysis in a smarthome system, to track motion of human limbs so as to make determinations (with a device that houses an end node) to identify abnormalities in their movement to make determinations about whether a person has fallen, to identify the person (e.g., as being the resident of the home or not), or using vector analysis to make a more complex determination of the person's current activity such as determining that the person is eating, sleeping, exercising, talking on a telephone, watching television, or carrying on some more complex social interaction (e.g., playing cards with a group of other people, or providing a lecture or having a verbal discussion with the group of other people). The user agent for the camera device could have a relationship through the overlay network with a user agent of an intelligent pillbox equipped with motion sensors to determine when particular compartments of the pillbox have been opened and closed. One such device having such user agents could be programmed to periodically collect data from each of the user agent devices and compare it to a medication schedule to generate an indication whether medication has been taken according to the schedule. The particular determining agent may then report information to a central service, where the reporting may be conditional, such as the reporting occurring only periodically if the patient was found to have taken medication on time, but occurring immediately upon the determination having been made if the patient is determined to have missed (e.g., so that a central service can follow up manually with the patient, such as via a telephone call or a visit by a home health provider).

The two nodes may then enter into periodic communications of the sensed temperature values from end node 102A. For example, node 102C may periodically poll node 102A for information, or node 102A may periodically submit data on its own. Node 102A may also submit data when a memory cache is filled, such as after it has collected n temperature readings (where n is a positive integer value). During this process, node 102C may store the parameter values that it receives, and may also hash copies of one or more of the values. Node 102C may, in the meantime, have also formed similar relationships with one or more other end nodes in its wireless range, such as end node 102b, and may be collecting data generated by their sensors also.

At some point, a service that seeks distributed temperature readings may communicate through network 110 and gateway 108 with end node 102C. Such a service may find node 102C in various manners. For example, node 102C, when it was set up, may have communicated into a central service that tracks IP addresses of such communicating sensor nodes, such as a service maintained by a manufacturer of end node 102C or another trusted organization like Google or Facebook. Generally, the types of sensors tracked in this manner would be sensors that collect non-confidential information that owners of the sensors do not mind sharing for the common good. Such sharing may also be accompanied by benefits to the owners of the sensors, such as being provided access to information (e.g., being able to access data delivered by other sensors of the same type in a common network) or being paid small amounts for the data. Upon the end node 102C registering with such a service, it may then periodically report data that it receives and/or be queried by the service to provide such data on demand— e.g., if a weather researcher requests certain types of specific data.

Privacy may be maintained for entities on the overlay network using various forms of authentication, anonymity, and end-to-end encryption. For authentication, the UCIs used to identify end nodes may be linked to certificates, which are generated and assigned based on end node name, all of which are granted by having a relation to at least one node, starting with the bootstrap node. Anonymity may be enforced by programming nodes that aggregate data to strip away any agent-identifying information. Similarly, the nodes that report their data may avoid identifying its sources when it forwards information, and a node and make it harder to determine the origin of data by not revealing its other relations (similar to anonymization in n TOR, chaum mixers for email, etc.). The type of data that can be maintained and the type that must be removed so as to maintain anonymity will vary based on the implementation. Generally, enough data should be stripped away so that a particular user agent or operator of a user agent cannot be readily "triangulated" using different instances of the data that is maintained. One security threat for the overlay network is injection of false context information, which may be countered by the ranking/clustering mechanism rejecting relations to nodes that are identified as offering irrelevant context information.

The types of implementations that can be carried out using such nodes as part of a distributed overlay network are varied. For example, each node in a network may be programmed to act as a neuron and each relationship between nodes as a synapse. As the Internet of Things grows to many millions or billions of devices, such modeling, with appropriate collection and aggregation of data, may result in a sophisticated model of a human nervous system, where the processing is extensive but is spread across millions or billions of computing devices (the user agents).

The particular end nodes 102A-C here may be enabled to make decisions locally based on global knowledge they have each previously acquired, so as to produce autonomic behavior. For example, in a system that has vehicle-to-vehicle communication on roadways, a node in an automobile may not be near a node in another automobile, and thus may be unable to directly pass information that it has obtained (e.g., from tire slip readings that indicate evolving road conditions). A vehicle that has information may communicate with a roadside box as the vehicle passes, and may learn that another vehicle is trailing by one mile. The first vehicle may use such information to make a decision to pass a certain amount of data to the box, for the box to forward the information to the following vehicle when it passes. In a similar manner, the network overlay may be delay tolerant, in that each node may store data that it would otherwise forward immediately, if there is no current ability to pass the data on. The node may then transmit the data when a relevant connection becomes available.

In this manner, then, system 100 can provide a distributed sensor system in an overlay network that self-organizes and provides for both distributed and central collection of data from various sensors. The system can be flexible and extensible in that one or more different users may deploy sensors for their owner personal purposes, and may also allow their sensors to communicate with other sensors, and allow their sensor data to be used outside their own network.

Figure 2:
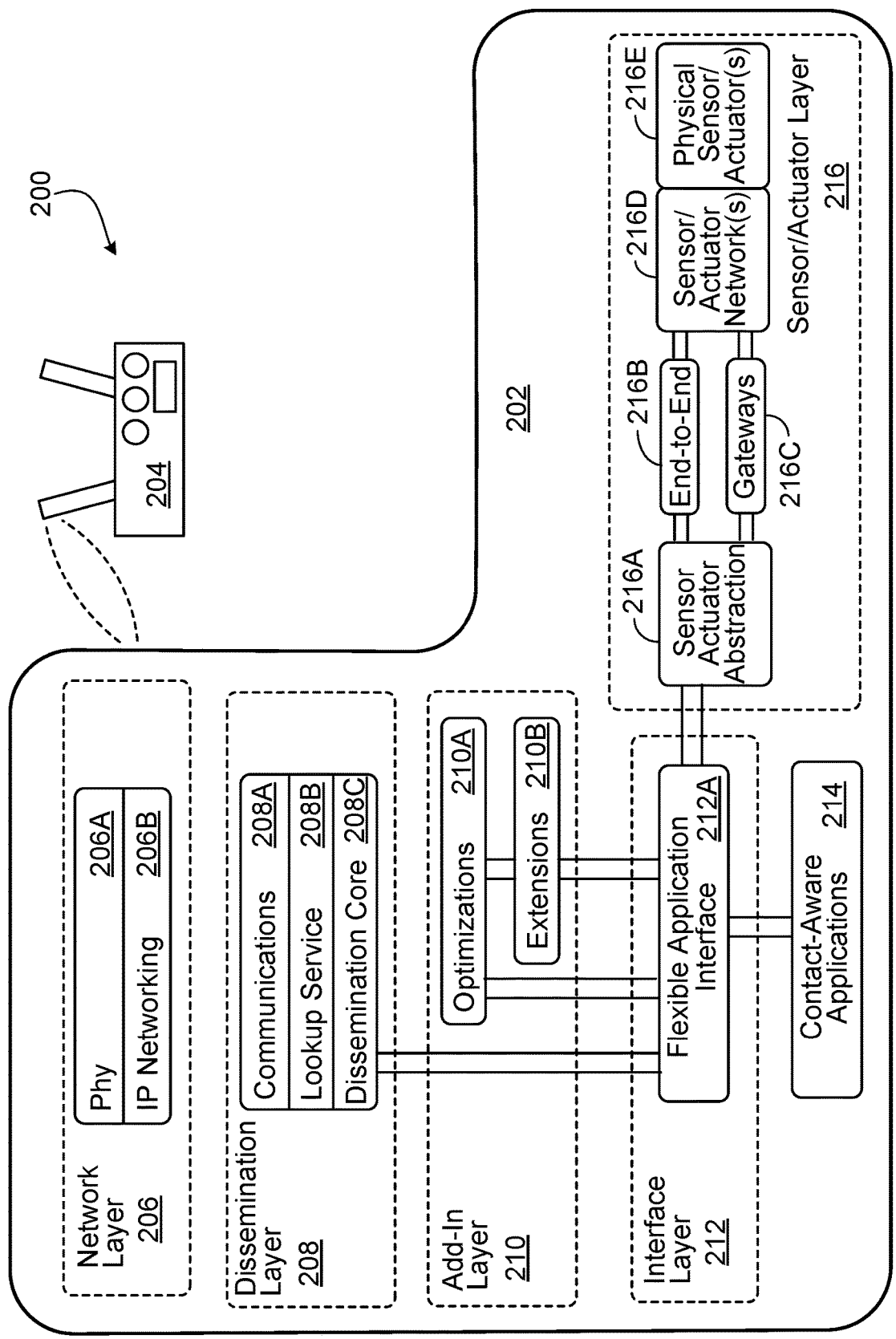
FIG. 2 is a schematic diagram of a particular end node for a networked sensor system.

FIG. 2 is a schematic diagram of a particular end node 202 for a networked sensor system 200. In general, the node 202 may be similar or the same as node 102C discussed above for FIG. 1. The node may generally be multi-functional in that it can both collect, store, and report data from its own sensors, but also form communicating relationships with other nodes in its wireless range and collect, store, and report data from them. The detail of the node 202 is shown here arranged generally according to the familiar OSI-ISO stack for purposes of easy illustration, though different components may be provided in certain implementations and at different layers of the stack.

In this example, the end node 202 communicate with a gateway 204, such as a common wireless router that may be connected to a network such as the Internet. The end node 202 may establish a connection with the gateway 204 when it is first deployed and configured by a user. Although not shown, the end node 202 may also establish communications with other end nodes, including end nodes that are identical to end node 202 and end nodes that differ in form from end node 202.

Referring now more particularly to the structural components of end node 202, a network layer 206 includes a PHY 206A and an IP networking module 206B. These components may, in a familiar manner, be in charge of placing signals on the wireless medium for communication according to a common protocol such as an IEEE 802.11 protocol or other common protocol.

A dissemination layer 208 acts to obtain and format data to be provided to the network layer 206, and to first interpret data received from the network layer 206. The dissemination layer 208 includes a communications module 208A, a lookup service 208B, and a dissemination core 208C. The communications module 208A establishes a new communication layer as part of the overlay network via a specific dissemination core, thus allowing different choices for lookup services and communication technology without needing to make changes to other layers. The lookup service 208B provides a mechanism to resolve UCIs so as to determine the location of a sought-after piece of information or entity. The look-up service can be implemented in a variety of different ways, such as a distributed hash table (a hash table that is stored and used by multiple different ones of the nodes), a distributed graph, or a cloud server. And the dissemination core 208C exposes primitive functions for publishing, retrieving, and transferring information in a peer-to-peer manner on the overlay network, to the overall platform. It is specific to implementation of the networking layer and bridges the gap between the network layer and upper layers of the platform.

Various primitives in the system, via the use of an underlying network and an overlay network, provides the ability to create models using primitives, from objects that are persisted locally but are made available through a global addressing and look up scheme. The usage of the primitives takes the form of "resolve" involving registering a UCI with the system "get" involving finding an endpoint that contains a submitted UCI, and "subscribe" to get the current data from the identified UCI.

A query API may also be provided to accept user input definitions or complex multi-criteria proximity-relationships. The API can allow developers to define and introduce query comparators into the architecture of the distributed system (where each query comparator is assigned a unique ID with which it is identifiable over the collection of comparators and persisted). It also permits updating and deletion of query comparators, and the ability to determine if a particular comparator exists with a known identifier. Moreover, it permits developers to declare queries for immediate execution, to be forwarded to a query engine in each node. Also, it returns the subset of relevant context entities that satisfy current query parameters, which have been collated and filtered by the system.

The distributed map reduce divides a task based on global data and lets nodes perform a function on a portion of this global data and return the result. Such an approach allows the combined computing power of the various devices that implement the nodes in an overlay network to address possibly large and complex tasks. The system may additionally accept a script (not just a simple command), and because the nodes are aware of their relationships, the execution of the script may be distributed to other nodes in whole or in part, performing a function on global data. As a result, the cloud may be agnostic as to the number of nodes that are involved. The system can also accept a command or script and map it to nodes that are selected according to some characteristics that the script specifies, which may cause the codes to perform a function on their respective local data. For example, PLCs in a smartgrid may be requested to look for some defined occurrence in their local log files and send back any identified results.

The bloom filters generally are probabilistic data structures that are used to test whether an element is a member of a set, and may be implemented as distributed hash tables present in each of the end nodes. They act to determine whether a node or value exists in the population of end nodes, and assist in locating the particular node, which is centrally useful for peer-to-peer networks like the overlay networks described herein.

An add-in layer 210 permits various forms of extensions to be plugged in (e.g., for analytics, delay-tolerant networking, range queries, etc.). The layer exposes itself as a mechanism through which developers add additional functionality and/or optimization algorithms to the system. An add-in can be used in order to make the system meet specific application requirements, sought-after quality of experience, or available capacity in regards to computational power and bandwidth. Add-ins are generally either optimization 210A (optimizing behavior and functionality of the overall system) or extension 210B (adding functionality that applications might demand) components, Optimizations can include, for example, clustering of information, caching, persistence, intelligent routing, and decision-making to determine when to optimally send data from one end node to another. The extensions 2108 can, for example, include logical context objects, semantics, reasoning, ranking of content information, search engines, query language, and context agents. Communications within the node 202 may bypass the add-in layer in appropriate circumstance, such as when content-aware applications decide (based on the context information) that only information needs to be exchanged, without relying on further support from either extensions or optimizations. Such may occur in smarthomes with reliable power, computing, and communication resources. Alternatively, when a communication requires fewer connections, it will be processed by the optimizations module 210A, and when it requires inference, it will be processed by the extensions module 2108.

An interface layer 212 provides code for interacting with various sensors and managing data produced by those sensors. The interface layer 212 may use a flexible application interface 212A for such purposes. The interface 212A may vary for different applications and for different types of end nodes. In certain implementations, the interface layer may provide a common application programming interface by which applications can communicate with the stack. The interface layer 212 may also expose the primitive operations discussed above to other layers in the stack. Moreover, the interface layer may provide a data storage API with which the other layers may interact conveniently to have data they have gathered be stored and made accessible to outside requests through the same API. Also, a messaging API may manage communications with nodes outside of node 202, including for the establishment of relationships with other nodes and for the subsequent passing of data between nodes, whether as unprompted transmissions of data, requests for data transmission, or responses to such requests.

As one example, the interface 212A may implement a home weather station and cause end node 202 to collect temperature, humidity, and barometric pressure readings, and also to communicate with an app on a portable device such as a tablet or smartphone, so that such readings can be displayed ad manipulated by the app.

Other context-aware applications 214 may also be loaded onto the end node 202. For example, one application may manage storage, organization, and transmission of weather data collected by the end node 202. Such a context-aware application can be programmed to interact with a weather app on a user's smartphone and also to provide requested data to remote requesters such as weather service like those described above and below.

As another context-aware application example, a clothing store may be outfitted that digital signage and clothes that are tagged with Bluetooth or other transmitters and with sensors (e.g., motion or proximity sensors). Depending on which clothes a customer picks up determined by the proximity of the customer's smartphone, some recommendations can be displayed on a screen nearby. If the customer reappears at the same location, this pattern can be reinforced, including by identifying data about products the customer was holding in a particular area the last time the customer was sensed as being there.

Accessed by the flexible application interface 212A under control of the context-aware applications 214 is a sensor/actuator layer 216. The layer 216 may be responsible for managing incoming data from whatever sensors are provided on the node 202, and for controlling the operation of actuators on the node 202. A sensor/actuator abstraction 216A may manage communications for such a layer 216 with the other layers in the stack, and more particularly with flexible application interface 212A. More specifically, the sensor/actuator abstraction may enable a generalized method to produce information and provide it to the system having the overlay network. But there exist a large number of different sensors and actuators, which use many different technologies. The sensor/actuator abstraction addresses this in order to provide the system with the information and functionality that applications require. The sensor/actuator abstraction layer is therefore separated into four components: the actual sensors and actuators, different sensor and actuator networks, a sensor and actuator gateway, and an abstraction component.

The sensor/actuator abstraction 216A may communicate with one or more sensor/actuator networks 216D that are made up of one or more physical sensors/actuators through an end-to-end 216B and/or gateways 216B. The end-to-end 216B represents end-to-end communication enjoyed by end nodes directly communicating with each other with the abstraction component, and without the need for a gateway to carry out the intra-network functionality. The gateways 216C mediate the communication with each specific sensor and actuator type, requiring a specific implementation for each new sensor or actuator network that wishes to be integrated into the overall overlay network. The gateway provides access to the collection of sensors and actuators regardless of the underlying technology. In this manner, then, the sensor/actuator layer manages the collection of all sensed data and turns it into a form that is usable by the context-aware applications 214, and to the greater world outside the end node 202.

The structural components describe here, then, for end node 202 may allow inexpensive and flexible implementation of a distributed sensor network. General, low-cost and low-power optimized components may be used for various portions of the end node 202, such as the network layer 206. Other layers, such as the interface layer 212 and the context-aware applications 214, may be special-purpose and directed to the care and management of data that is gathered using (and sending control signals to) the sensor/actuator layer 216 on the end node. Using the techniques described above and below, such an end node 202 may form communication and reporting relationships with other similar nodes, using, e.g., a publish/subscribe approach, so that data gathered by the various sensors can be discovered by services outside the particular sub-net of end nodes, and may be utilized in appropriate manners.

Figure 3:
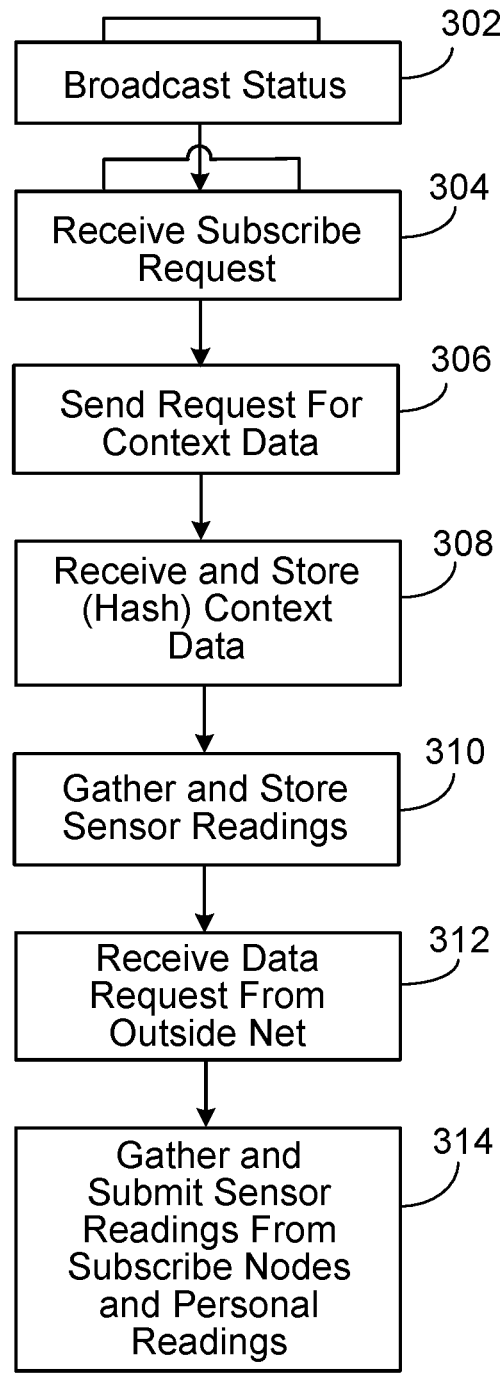
FIG. 3 is a flow chart of a process for managing end nodes in a networked sensor system.

FIG. 3 is a flow chart of a process for managing end nodes in a networked sensor system. In general, the process involves steps that a particular end node may take to communicate with other nodes and with a central requester for information from those other nodes. The particular end node may obtain, store, and aggregate data generate from sensors in the other end nodes and may filter requests for information so as to send information from nodes that match the particular requests. The process discussed here, in certain particular implementations, may be carried out by the systems 100 and 200 shown and described in FIGS. 1 and 2, respectively.

The process in this example begins at box 302, where a particular end node broadcasts its status wirelessly into the area around it. Such a broadcast may indicate that the particular end node is willing to act as a master for other end nodes, so as to receive sensor data from those other nodes and report such sensor data. To that end, the particular end node may be a more capable end node than the other end nodes (where it may have the storage for such data and the ability to respond to requests for such data), may have the same capabilities as the other end nodes but may be a node that has been elected to be the master (e.g., via a raft consensus or other consensus algorithm), or may be one of multiple different nodes that collect data from the other end nodes in an overlapping fashion (e.g., the particular end node may both collect data from other end nodes, and supply data it collects to other end nodes for them to store the data and provide it in response to received requests).

At box 304, and in response to the broadcast of the status, the particular end node receives a subscription request from another end node that received the broadcast of the status. Such a request may indicate a desire by the other end node to provide data to the particular end node. The two noes may be programmed to carry out a hand shake process, e.g., by which each indicates its particular capabilities and they reach an agreement on what particular protocol to use in the future for exchanging information. Such negotiation may include information about frequencies with which the other node reports data or the particular node requests data, the fields of data that are to be reported (e.g., where different versions of the nodes over time may accept more or less fields of data, types of data, or the like). Such handshake may generally establish an agreement that can then be followed by each respective end node in the future so as to maximize the quality and efficiency of future communications.

At box 306, the particular end node sends a request for context data to the other end node. Such a request may occur as part of a handshake process or after a handshake process. The request may be configured to cause the other node to tell the particular node about itself. Such information may include the type of sensor or sensors on the other end node, lat/long information for the other end node, whether the other end node is indoors or outdoors or in a moving vehicle, and other information that is relevant to understanding the readings being obtained by the sensors of the other end node.

At box 308, the particular node receives and stores the context data. The particular end node may also have received corresponding data from other end nodes that responded to its broadcast of its status as a node willing to collect data from other nodes. Thus, the data may be stored in one or more multi-dimensional structures such as tables or other forms of searchable database. In some implementations, the data may be hashed—either by the particular end node or the other end nodes—before it is stored. Such hashing may make it easier in the future for the particular end node to generate matches when a request is made using particular context data, such as where hashing creates strings of equal length even for initial values that differ from each other in length, and where optimized matching algorithms may be used.

At box 310, the particular end node gathers and stores sensor readings from each of the other end nodes that have subscribed to provide such data. Such gathering of data may occur before or after the particular end node receives a request from outside its net for such data. The collection may also be a push (where each other node sends its data periodically or upon identifying a substantial change in a sensed value, such as sending an update when a temperature is identified as changing by more than 2 degrees) or a pull (where the particular end node polls the other end nodes so as to request a response that will include sensor data). The collection may also be of some or all of the data from particular ones of the other end nodes. For example, when a certain other end node registered with the particular end node at boxes 306 and 308, it may have indicated that it was willing to submit temperature data, even if it captures more data such as humidity data and motion data. For example, perhaps the operator of such a sensor considers temperature data to be less valuable and thus treats it as less proprietary, so that it configures that certain other end node to advertise itself as only sharing temperature data. Such an end node may share additional data with a different data-collecting end node that has credentialing information, such as information that identifies it as being a node operated by the same operator as the certain other end node. Thus, each end node, in certain implementations, may provide different levels of transparency to its data vis-à-vis requesting nodes, depending on a variety of factors, including based on "who" the requesting node belongs to.

At box 312, the particular end node receives a request from outside its sub-net (where the sub-net is the group of end nodes that report to the particular end node) for data gather within its sub-net. Such a request may come in a variety of forms. For example, a cloud service may be arranged to communicate with certain end nodes of a particular type, and such end nodes, like the particular end node discussed here, may register with such a service—e.g., where the service may be operated by the manufacturer of the end nodes or by a trusted organization such as Facebook or Google. Such registration may involve submitted an address for the particular end node to such a service, along with contextual information, such as information about the particular end node's geographic location and the sorts of values that it reports data for (e.g. temperature values). The central service may then periodically make requests of the particular end node and other registered end nodes, or may make requests in response to a defined event. For example, the trusted service may make itself available to climate researchers and may allow such researchers to make queries of the service. Such queries may request historical temperature data for a particular area or areas. When a researcher requests current temperature data, the trusted service may send out a request to all of the registered end nodes in a geographic area identified by the researcher.

At box 314, the particular end node gather and submits data for sensor readings from the other end nodes and from itself (where applicable). For example, upon receiving a request for temperature data form the trusted service, the particular end node may search its hash table for entries relating to temperature. It may also apply other filters, such as by only searching for temperature readings in a particular geographic area or during a particular range of times (where the researcher's request imposed such limitations, and where the particular end node stores data from multiple different times for each sensor in its database). In addition or alternatively, the particular end node may send requests to each of its subscribed other end nodes (or those responsive to the request from the trusted service) so as to gather their stored and/or instantaneous temperature readings. The particular end node may then aggregate and package the data from the other end nodes, and transmit it back to the requesting trusted service.

In this manner, then, the process just described may provide a mechanism by which various people and organizations may deploy sensors for their own purposes and also make them wholly or partially available for interrogation by others—either widely by the public or by others what have certain qualifications and credentials.

EXAMPLES

A number of exemplary possible implementations of the systems and techniques described here are now provided to better illustrate how particular systems may be used.

In a first example, a home healthcare system may be implemented using an autonomous home sensor network that is capable of communicating with a central service. In particular, a patient may already own a tablet or smartphone and may acquire a home healthcare application from an on-line application marketplace, for free or for a cost. The patient may then acquire a number of sensored end nodes, such as from a retail store or website, or from a healthcare provider or insurer. Such sensors may include a web cam, a medication tracker in the form of an electronic pillbox, a blood pressure cuff, a glucose sensor, a blood analyzer, an electronic stethoscope, a human thermometer, a fitness tracking band with motion sensors (e.g., FitBit), and other sensors for tracking the patient's vital signs, activity, and other factors. The patient or a representative for the patient may activate each such sensor conveniently, and each may communicate with a main sensor system (e.g., a desktop blood pressure cuff, pulse oximeter, etc.). Each of the sensors may then periodically send data to the main sensor system which may store the patient data received over time. Periodically, the main sensor system may send the data to a cloud service that is accessible by the patient's caregivers, and that can perform automated analysis on the captured data, such as to identify potential changes in the patient's health so as to trigger an alert for a caregiver to follow up with the patient.

As a second example, a distributed sensor network may be used to improve transit-related actions by various users, such as truck drivers delivering materials and individuals seeking to get to work or a meeting as efficiently as possible. Such a network can include a grouping of environment sensors, e.g., to sense weather and temperature conditions that can be used to predict travel conditions in the future. The network can also include motion sensors on mass transit vehicles to indicate schedules of such vehicles and to indicate roadway speeds in particular areas. And the network may include sensors mounted on individual users or in vehicles of individual users.

Such an approach does not merely predict a particular driver's path based on other drivers' activity on the same path. Rather, it may consider other options that may allow a driver to get from A to B, such as the availability of several modes of transportation offered by others. For example, the system can be used to aggregate and share information concerning all the users (drivers, etc.) and resources (vehicles, bicycles, ferries, public transport, etc.) in traffic in order to predict the best choice for a person to travel from A to B within a given time frame, and minimize the overall cost for the environment, in view of a range of factors used to organize a person's travel, such as car-sharing, city-bikes-for-rent, Uber, public transport, etc., and taking into account factors and personal preferences such as willingness or unwillingness to walk or be outside (because of weather conditions).

Similarly, distributed analytics can be performed on the gathered data, such as by making determinations across large geographic areas but using power from the distributed end nodes.

Figure 4:
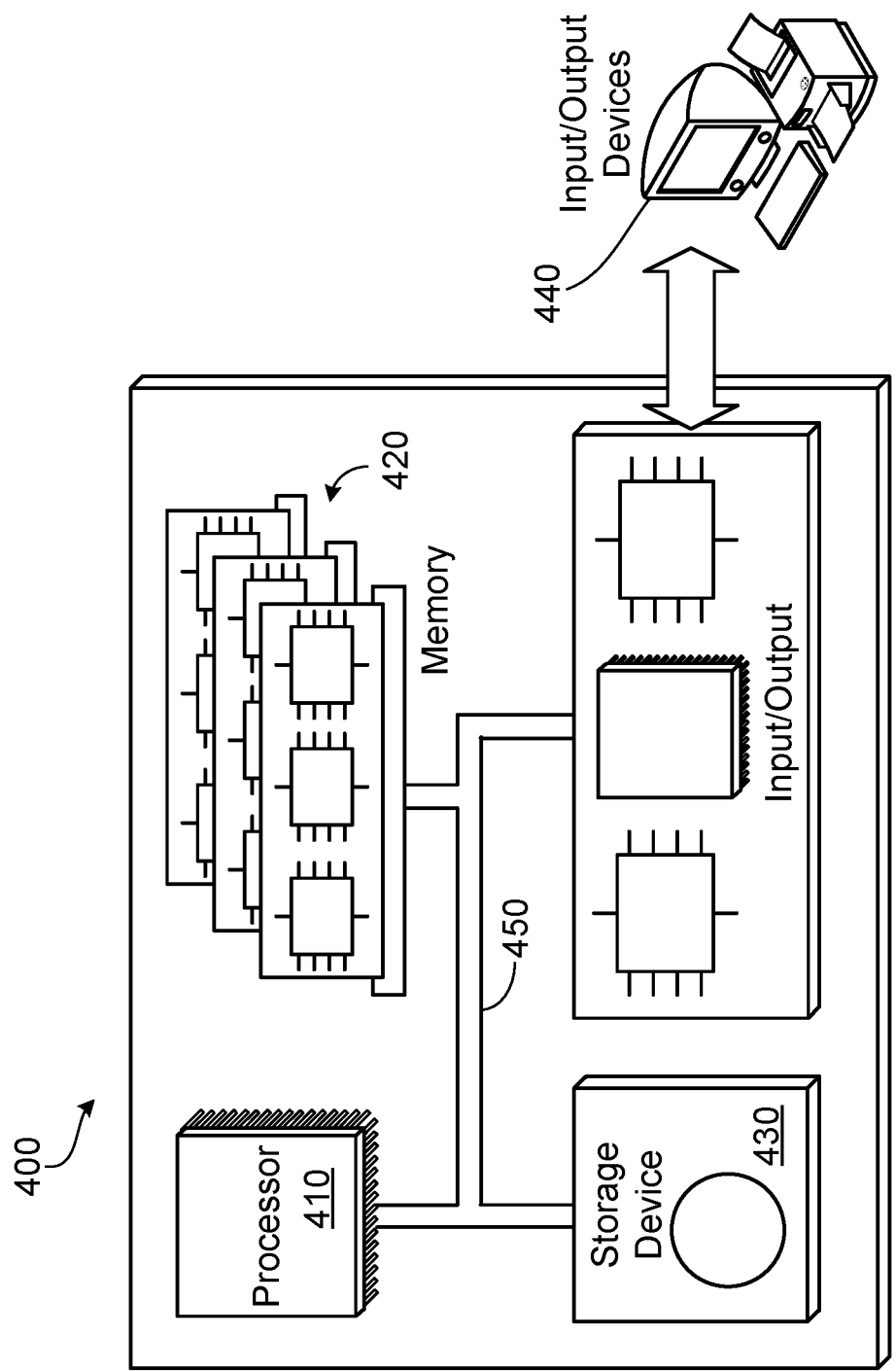
FIG. 4 shows an example computer system that can be used singularly or in multiples to carry out the techniques described herein.

FIG. 4 is a schematic diagram of a computer system 400. The system 400 can be used to carry out the operations described in association with any of the computer-implemented methods described previously, according to one implementation. The system 400 is intended to include various forms of digital computers, such as laptops, desktops, workstations, personal digital assistants, servers, blade servers, mainframes, and other appropriate computers. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for network management, the method comprising:
   assigning a first sensed wireless computing device, from among a plurality of sensed wireless computing devices, a responsibility for aggregating data that indicates sensor values for the plurality of sensed wireless computing devices;
   receiving, by the first sensed wireless computing device and from others of the plurality of sensed wireless computing devices in response to the requesting, data that indicates sensor values;
   aggregating, at the first sensed wireless computing device, the data that indicates sensor values; and
   transmitting the aggregated data to an application through a wide area network,
   wherein the sensed wireless computing devices are capable of forming a network and sharing data between themselves without management by the application.

2. The computer-implemented method of claim 1, wherein the data is aggregated in response to receiving a request from the central service, wherein the request identifies a particular parameter to which the data is to be directed.

3. The computer-implemented method of claim 2, wherein the first sensed wireless computing device identifies a subset of the plurality of sensed wireless computing devices to aggregate data from by comparing data from the request to contextual data that describes capabilities of particular ones of the plurality of sensed wireless computing devices.

4. The computer-implemented method of claim 1, wherein the plurality of sensed wireless computing devices cluster themselves into a sub-net using a relevance algorithm that identifies a relevance between particular ones of the sensed wireless computing devices to determine which sensed wireless computing devices to include in the sub-net.

5. The computer-implemented method of claim 1, wherein the first sensed wireless computing device and the others of the plurality of sensed wireless computing devices communicate by way of a network that is layered over an underlying local area network.

6. The computer-implemented method of claim 1, further comprising:
   determining at the first sensed wireless computing device, a degree of proximity of each of the others of the sensed wireless computing devices to the first sensed wireless computing device, and
   determining whether to aggregate data from each of the others of the sensed wireless computing devices based on a determined level of proximity between the sensed wireless computing devices.

7. The computer-implemented method of claim 6, wherein the determined level of proximity includes, as a factor, a determined geographic proximity between the first sensed wireless computing device and particular ones of the others of the plurality of sensed wireless computing devices.

8. The computer-implemented method of claim 1, wherein the first sensed wireless computing device and the others of the plurality of sensed wireless computing devices each represent nodes in their storage as first-class objects in an entity-relationship model.

9. One or more devices having tangible, non-transient machine-readable media having stored thereon, instructions that when executed perform operations comprising:
   assigning a first sensed wireless computing device, from among a plurality of sensed wireless computing devices, a responsibility for aggregating data that indicates sensor values for the plurality of sensed wireless computing devices;
   receiving, by the first wireless computing device and from others of the plurality of wireless computing devices in response to the requesting, data that indicates sensor values;
   aggregating, at the first wireless computing device, the data that indicates sensor values; and
   transmitting the aggregated data to an application through a wide area network,
   wherein the sensed wireless computing devices are capable of forming a network and sharing data between themselves without management by the application.

10. The one or more devices of claim 9, wherein the data is aggregated in response to receiving a request from the central service, wherein the request identifies a particular parameter to which the data is to be directed.

11. The one or more devices of claim 10, wherein the first sensed wireless computing device identifies a subset of the plurality of sensed wireless computing devices to aggregate data from by comparing data from the request to contextual data that describes capabilities of particular ones of the plurality of sensed wireless computing devices.

12. The one or more devices of claim 9, wherein the plurality of sensed wireless computing devices cluster themselves into a sub-net using a relevance algorithm that identifies a relevance between particular ones of the sensored wireless computing devices to determine which sensored wireless computing devices to include in the sub-net.

13. The one or more devices of claim 9, wherein the first sensed wireless computing device and the others of the plurality of sensed wireless computing devices communicate by way of a network that is layered over an underlying local area network.

14. The one or more devices of claim 9, wherein the operations further comprise:
   determining at the first sensed wireless transceiver, a degree of proximity of each of the one or more other sensed wireless transceiver to the first sensed wireless transceiver, and
   determining whether to aggregate data from each of the one or more other sensed wireless transceivers based on a determined level of proximity between the transceivers.

15. The one or more devices of claim 14, wherein the determined level of proximity includes, as a factor, a determined geographic proximity between the first sensed wireless computing device and particular ones of the others of the plurality of sensed wireless computing devices.

16. The one or more devices of claim 9, wherein the first sensed wireless computing device and the others of the plurality of sensed wireless computing devices each represent nodes in their storage as first-class objects in an entity-relationship model.

* * * * *